(12) United States Patent
Fukushima

(10) Patent No.: US 11,460,479 B2
(45) Date of Patent: Oct. 4, 2022

(54) SAMPLE INJECTION DEVICE AND METHOD OF ADJUSTING SAMPLE INJECTION DEVICE

(71) Applicant: Shimadzu Corporation, Kyoto (JP)

(72) Inventor: Daiki Fukushima, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 543 days.

(21) Appl. No.: 16/532,894

(22) Filed: Aug. 6, 2019

(65) Prior Publication Data

US 2020/0110107 A1 Apr. 9, 2020

(30) Foreign Application Priority Data

Oct. 3, 2018 (JP) .............................. JP2018-188400

(51) Int. Cl.
*G01F 25/00* (2022.01)
*G01N 35/10* (2006.01)
*B01L 3/00* (2006.01)

(52) U.S. Cl.
CPC .......... *G01N 35/1079* (2013.01); *B01L 3/508* (2013.01); *B01L 3/56* (2013.01); *B01L 2200/143* (2013.01); *B01L 2300/0663* (2013.01); *B01L 2300/0672* (2013.01); *B01L 2300/0832* (2013.01); *B01L 2400/049* (2013.01)

(58) Field of Classification Search
CPC ............ G01N 35/1079; G01N 25/0092; B01L 3/508; B01L 3/56; B01L 2300/0663; B01L 2300/0672; B01L 2400/049; B01L 2200/143; B01L 2300/0832; B01L 2200/148; G01F 25/0092; G01F 2/0084
USPC ....... 73/864.81, 1.16, 1.34; 702/87, 94, 100, 702/104
See application file for complete search history.

(56) References Cited

U.S. PATENT DOCUMENTS

| | | | |
|---|---|---|---|
| 5,879,627 A | 3/1999 | Tanihata | |
| 7,169,362 B2 | 1/2007 | Toi et al. | |
| 2020/0110108 A1* | 4/2020 | Cox-Muranami | B01L 3/502738 |

FOREIGN PATENT DOCUMENTS

| | | | |
|---|---|---|---|
| ES | 2559805 | * | 2/2016 |
| JP | 3367319 B2 | | 1/2003 |
| JP | 2004-170090 A | | 6/2004 |
| KR | 20130138332 | * | 12/2013 |
| WO | 2014153193 | * | 9/2014 |
| WO | 2019046261 | * | 3/2019 |

* cited by examiner

*Primary Examiner* — Robert R Raevis
(74) *Attorney, Agent, or Firm* — Muir Patent Law, PLLC

(57) ABSTRACT

This sample injection device is provided with a plunger drive unit for driving a plunger by a pulse motor, an encoder for detecting an operating position of the pulse motor, and a control unit for adjusting a reference position of the tip end of the plunger with respect to the syringe based on the operating position detected by the encoder when the tip end of the plunger is brought into contact with the end portion in the syringe on the tip end side.

9 Claims, 8 Drawing Sheets

SAMPLE INJECTION DEVICE AND METHOD OF ADJUSTING SAMPLE INJECTION DEVICE

CROSS-REFERENCE TO THE RELATED APPLICATIONS

The priority application number JP 2018-188400, entitled "sample injection device and method of adjusting sample injection device" filed on Oct. 3, 2018, invented by Daiki Fukushima, upon which this patent application is based is hereby incorporated by reference.

BACKGROUND OF THE INVENTION

Field of the Invention

The present invention relates to a sample injection device and a method of adjusting a sample injection device, and more particularly to a sample injection device and a method of adjusting a sample injection device in which a plunger is driven by a pulse motor operating in synchronization with pulse power.

Description of the Background Art

Conventionally, a sample injection device is known in which a plunger is driven by a pulse motor that operates in synchronization with pulse power. Such a sample injection device is disclosed, for example, in Japanese Patent No. 3367319.

Japanese Patent No. 3367319 discloses a sample injection device provided with a syringe (cylindrical tube) for storing a sample therein, a needle attached to the tip end side of the syringe and having a flow passage therein, and a plunger (rod-shaped piston) for suctioning the sample into the cylinder and discharging the sample out of the cylinder by moving in the up-down direction in the syringe. In Japanese Patent No. 3367319, a stepping motor (pulse motor) that operates in synchronization with pulse power is used as a plunger drive mechanism for moving the plunger in the up-down direction in the syringe.

Here, although not clearly described in Japanese Patent No. 3367319, in a conventional sample injection device as described in Japanese Patent No. 3367319, it is known that if the reference position (the reference position which is served as the position of the tip end of the plunger with respect to the syringe at the time of starting the suction of the sample and ending the discharge of the sample) of the plunger with respect to the syringe when performing the suction and discharge of the sample, the amount of suction and discharge of the sample by the plunger deviates from an intended volume depending on the amount of deviation. Therefore, in a conventional sample injection device as described in Japanese Patent No. 3367319, it is required to adjust the reference position of the plunger so as to bring the reference position as closer as possible to the needle side end portion in the syringe. Further, in a conventional sample injection device as described in Japanese Patent No. 3367319, when the plunger is removed from the syringe like in a case in which a syringe attached to a sample injection device is replaced with another syringe, each time of the removal, it is necessary to adjust the reference position of the plunger with respect to the syringe again.

Therefore, in a conventional sample injection device as described in Japanese Patent No. 3367319, it is conceivable to adjust the reference position of the plunger by driving the plunger by a pulse motor to bring the plunger close to the end portion of the needle end (tip end side) in the syringe. However, if the plunger is brought into contact with the end portion in the syringe on the needle side, the pulse motor will lose the synchronous (become out of synchronization), resulting in a reversed rotational direction of the pulse motor, which causes separation of the plunger from the needle side end portion in the syringe (by, for example, a distance of about several pulses). For this reason, in a configuration in which a plunger driven by a pulse motor is provided like in a conventional sample injection device as described in Japanese Patent No. 3367319, there is a problem that it is necessary to manually perform an adjustment of pressing (moving) the plunger so that the reference position of the plunger takes a position as close as possible to the end portion in the syringe on the needle side.

SUMMARY OF THE INVENTION

The present invention has been made to solve the aforementioned problems, and one object of the present invention is to provide a sample injection device and a method of adjusting a sample injection device capable of automatically adjusting a reference position of a plunger driven by a pulse motor.

In order to attain the aforementioned object, the sample injection device according to the first aspect of the present invention include:
a cylindrical syringe configured to store a sample therein;
a needle attached to a tip end side of the syringe and having a flow passage formed therein;
a plunger configured to suction the sample into the syringe or discharge the sample out of the syringe through the flow passage of the needle by linearly reciprocating inside the syringe;
a plunger drive unit configured to drive the plunger by a pulse motor that operates in synchronization with pulse power;
an encoder configured to detect an operating position of the pulse motor; and
a control unit configured to control driving of the pulse motor of the plunger drive unit,
wherein the control unit is configured to adjust a reference position of a tip end of the plunger with respect to the syringe based on the operating position detected by the encoder when the tip end of the plunger is brought into contact with an end portion in the syringe on the tip end side.

In the sample injection device according to the first aspect of the present invention, as described above, it is provided with the control unit configured to adjust a reference position (the reference position which is served as a position of the tip end of the plunger with respect to the syringe when the suction of the sample starts and the discharge of the sample ends) of a tip end of the plunger with respect to the syringe based on the operating position of the pulse motor detected by the encoder when the tip end of the plunger is brought into contact with the end portion in the syringe on the tip end side.

With this, even if the plunger leaves the end portion in the syringe on the needle side with the loss of synchronous of the pulse motor due to the fact that the tip end of the plunger is brought into contact with the end portion in the syringe on the tip end side, the control unit adjusts the reference position based on the operating position of the pulse motor detected by the encoder when the tip end of the plunger is actually brought into contact with the end portion in the syringe on the tip end side. Therefore, it is possible to automatically adjust the reference position (the reference position which is served as a position of the tip end of the plunger with respect to the syringe at the time point when the suction of the sample starts and the discharge of the sample ends) of the plunger driven by the pulse motor.

In the sample injection device according to the first aspect of the present invention, preferably, the encoder is configured to detect a rotation operating position of the pulse motor as a count value, and the control unit is configured to adjust the reference position based on the count value detected by the encoder when the tip end of the plunger is brought into contact with the end portion in the syringe on the tip end side.

By configuring as described above, since the operating position (rotation operating position) of the pulse motor is detected as a count value which is easy to be processed by the control unit, the process by the control unit for adjusting the reference position can be performed quickly.

In this case, preferably, the count value is configured to increase in accordance with an operation to one side of the pulse motor and decrease in accordance with an operation to the other side of the pulse motor, and the control unit is configured to adjust the reference position based on the count value when the count value is reversed from an increase state to a decrease state or from a decrease state to an increase state when the tip end of the plunger tip is brought into contact with the end portion in the syringe on the tip end side.

By configuring as described above, the count value when the increase state and the decrease state are reversed indicates the count value when the pulse motor lost the synchronous and the rotational direction of the pulse motor is reversed (i.e., the operating position where the tip end of the plunger is brought into contact with the tip end side of the syringe), and therefore the reference position can be easily adjusted based on the count value.

In the configuration in which the reference position is adjusted based on the count value when the count value is reversed, preferably, the control unit is configured to adjust the reference position based on an amount of change of the count value after reversal of the count value when the tip end of the plunger is brought into contact with the end portion in the syringe on the tip end side and the count value is reversed.

By configuring as described above, the reference position can be adjusted appropriately based on the amount of change.

In this case, preferably, the control unit is configured to adjust the reference position by setting the count value at a position where the tip end of the plunger is moved in the syringe by driving the plunger drive unit so that the tip end of the plunger approaches the count value when the tip end of the plunger is brought into contact with the end portion in the syringe on the tip end side by an amount smaller than the amount of change of the count value after the reversal of the count value as the reference position.

By configuring as described above, the count value is changed in the direction before the reversal by the amount smaller than the amount of change of the count value after the reversal. Therefore, the reference position can be easily adjusted so that the tip end of the plunger will not be brought into contact with the end portion in the syringe on the tip end side and the tip end of the plunger approaches the end portion in the syringe on the tip end side.

In the sample injection device according to the first aspect of the present invention, preferably, the control unit is configured to bring the tip end of the plunger into contact with the end portion in the syringe on the tip end side in a state in which a drive current of the pulse motor of the plunger drive unit is lowered than a normal state in which the plunger is reciprocated in the syringe to suction the sample into the syringe or discharge the sample out of the syringe.

By configuring as described above, the torque of the pulse motor can be reduced to reduce the force (force that the plunger presses the syringe) when bringing the tip end of the plunger into contact with the end portion in the syringe on the tip end side, so that it is possible to suppress the increase in mechanical load on the plunger and the syringe. Further, when bringing the tip end of the plunger into contact with the end portion in the syringe on the tip end side, unlike the case in which the force (force that the plunger pushes the syringe) acts from the plunger to the syringe is large, the amount of elastic deformation occurring in the plunger and the syringe can be reduced. As a result, it is possible to suppress the possibility of occurrence of errors in adjusting the reference position.

In the sample injection device according to the first aspect of the present invention, preferably, the sample injection device further includes:

an optical sensor configured to detect a position of the tip end of the plunger using reflection of light, wherein the control unit is configured to adjust the reference position based on the operating position after bringing the position of the tip end of the plunger close to the reference position based on the position of the tip end of the plunger detected by the optical sensor.

By configuring as described above, the reference position is adjusted relatively precisely based on the operating position after bringing it relatively close to the reference position using the optical sensor. Therefore, the adjustment time of the reference position can be shortened as compared with the case in which the operation for roughly approaching the reference position is not performed.

In order to attain the aforementioned object, the method of adjusting a sample injection device according to the second aspect of the present invention, includes: a cylindrical syringe configured to store a sample therein; a needle attached to a tip end side of the syringe and having a flow passage formed therein; a plunger configured to suction the sample into the syringe or discharge the sample out of the syringe through the flow passage of the needle by linearly reciprocating inside the syringe; a plunger drive unit configured to drive the plunger by a pulse motor that operates in synchronization with pulse power; and an encoder configured to detect an operating position of the pulse motor, the method comprising:

a step of bringing a tip end of the plunger into contact with the end portion in the syringe on the tip end side by the pulse motor of the plunger drive unit;

a step of detecting the operating position when the tip end of the plunger is brought into contact with the end portion in the syringe on the tip end side by the encoder; and a step of adjusting a reference position of the tip end of the plunger with respect to the syringe based on the detected operating position.

In the method of adjusting the sample injection device according to the second aspect of the present invention, as described above, the tip end of the plunger is brought into contact with the end portion in the syringe on the tip end side, and the operating position of the pulse motor when the tip end of the plunger is brought into contact with the end portion in the syringe on the tip end side is detected. Based on the detected operating position, the reference position of the tip end of the plunger with respect to the syringe (the reference position which is served as the position of the tip end of the plunger with respect to the syringe at the time of starting the suction of the sample and ending the discharge of the sample) is adjusted. With this, even if the plunger leaves the needle side end portion in the syringe with the loss of synchronous of the pulse motor due to the fact that the tip end of the plunger is brought into contact with the end portion in the syringe on the tip end side, the control unit adjusts the reference position based on the operating position of the pulse motor detected by the encoder when the tip end of the plunger is actually brought into contact with the end portion in the syringe on the tip end side. Therefore, it is possible to provide a method of adjusting a sample injection device capable of automatically adjusting the reference position (the reference position which is served as the position of the tip end of the plunger with respect to the syringe at the time of starting the suction of the sample and ending the discharge of the sample) of a plunger driven by a pulse motor.

In the sample injection device according to the second aspect of the present invention, preferably, the encoder is configured to detect a rotation operating position of the pulse motor as a count value, wherein the count value is configured to increase in accordance with an operation to one side of the pulse motor and decrease in accordance with an operation to the other side of the pulse motor, wherein the step of adjusting the reference position comprises:

a step of acquiring an amount of change after reversal of the count value when the count value is reversed from an increase state to a decrease state or from a decrease state to an increase state when the tip end of the plunger is brought into contact with the end portion in the syringe on the tip end side; and a step of adjusting the reference position by setting the count value at a position where the tip end of the plunger is moved in the syringe by driving the plunger drive unit so that the tip end of the plunger approaches the count value when the tip end of the plunger is brought into contact with the end portion in the syringe on the tip end side by an acquired amount smaller than the amount of change of the count value after the reversal of the count value as the reference position.

By configuring as described above, it is possible to grasp the position of the plunger moved due to the loss of synchronous after the tip end of the plunger is brought into contact with the end portion in the syringe on the tip end side by obtaining the amount of change of the count value after reversal when the count value is reversed. By setting the count value at the position at which the plunger is moved in the syringe so that the tip end of the plunger approaches the count value when the tip end of the plunger is brought into contact with the end portion in the syringe on the tip end side by the amount smaller than the acquired amount of change of the count value, the reference position can be adjusted so that the tip end of the plunger will not be brought into contact with the end portion in the syringe on the tip end side and the tip end of the plunger approaches the end portion in the syringe on the tip end side.

DESCRIPTION OF PREFERRED EMBODIMENTS

Hereinafter, embodiments embodying the present invention will be described with reference to the drawings.

With reference to FIG. 1 to FIG. 8, the configuration of the sample injection device 100 according to an embodiment of the present embodiment will be described.

Figure 1:
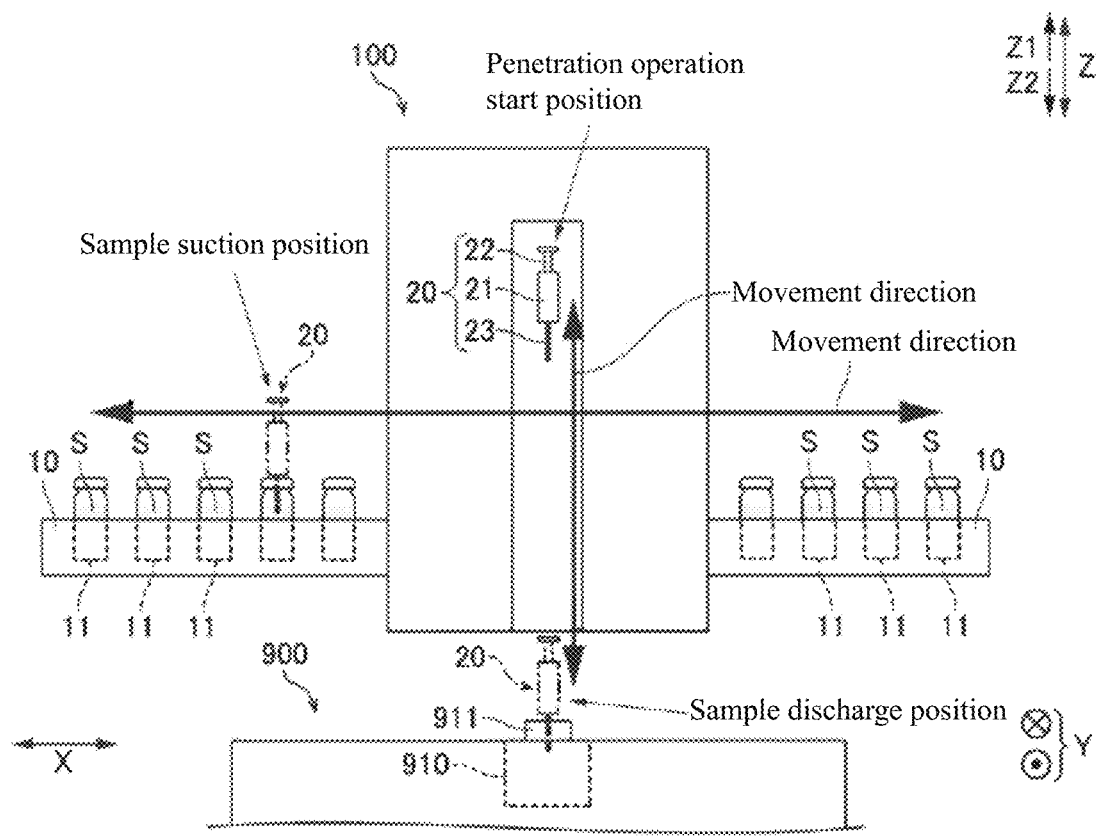
FIG. 1 is a diagram showing the overall configuration of a sample injection device according to an embodiment of the present invention.

As shown in FIG. 1, the sample injection device 100 is a device for injecting a sample S into a gas chromatography apparatus 900 for analyzing the sample S. The sample injection device 100 is provided with a turret 10 and an injector 20.

The turret 10 is a platform on which a vial 11 for storing a sample S, etc., is placed. A plurality of vials 11 is placed on the turret 10. In the sample injection device 100, the sample S is an organic solvent, such as, e.g., hexane and acetone.

Figure 3:
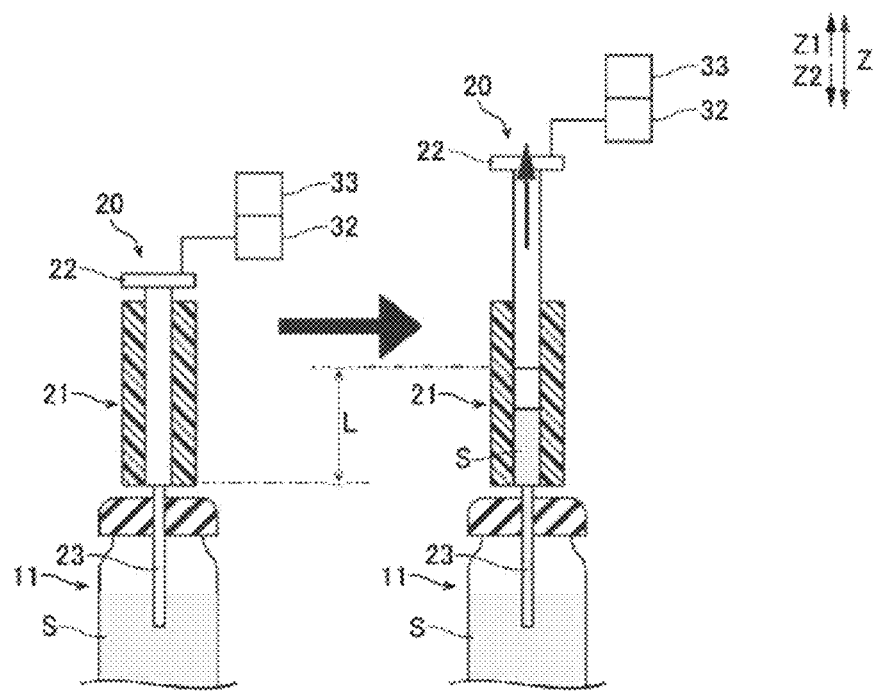
FIG. 3 is a diagram for explaining suction of a sample into a syringe of the sample injection device according to an embodiment of the present invention.

The injector 20 is configured to suction the sample S from the vial 11 storing the sample S of the analysis subject and inject the sample S into the sample introduction portion 910 of the gas chromatography apparatus 900. As shown in FIG. 3, the injector 20 includes a syringe 21, a plunger 22, and a needle 23.

The syringe 21 is formed in a cylindrical shape extending in the vertical direction (Z-direction) so that the sample S can be stored therein. The plunger 22 is arranged inside the syringe 21 and is configured to be movable in the Z-direction in the syringe 21. The plunger 22 is configured to suction the sample S into the syringe 21 or discharge the sample S out of the syringe 21 through the flow passage of the needle 23 by reciprocating in the syringe 21 in a straight line.

The needle 23 is attached to the front end side (tip end side, Z2 side) of the syringe 21. In the needle 23, a flow passage extending in the Z-direction is formed therein. The flow passage of the needle 23 is connected to the syringe 21 on the Z1 side, and an opening is formed on the front end side (Z2 side).

Figure 4:
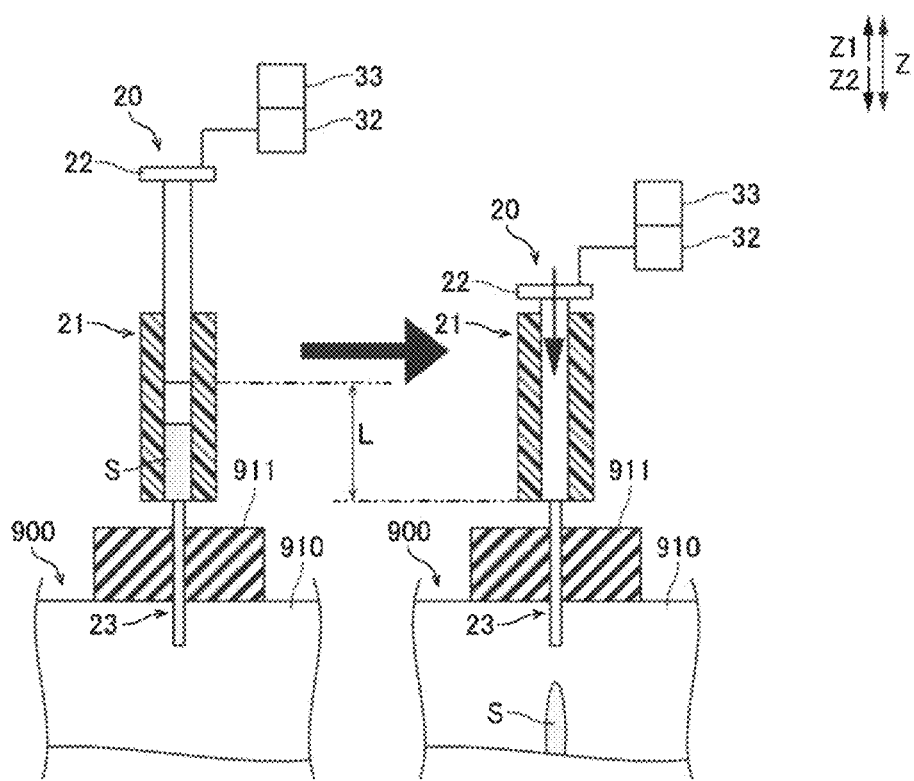
FIG. 4 is a diagram for explaining discharge of a sample out of a syringe of the sample injection device according to an embodiment of the present invention.

Thus, with the injector 20, it is possible to suction and store the sample S in the syringe 21 via the flow passage of the needle 23 (sample suction operation) by moving the plunger 22 from the front end side (Z2 side) in the syringe 21 (the left side in FIG. 3) to the rear end side (Z1 side) (the right in FIG. 3) in a state in which the tip end (Z2 side) of the needle 23 is introduced in the sample S. Further, as shown in FIG. 4, it is possible to discharge the sample S stored in the syringe 21 via the flow passage of the needle 23 (sample discharge operation) by moving the plunger 22 from the rear end side (Z1 side) in the syringe 21 (the left side state in FIG. 4) to the front end side (Z2 side) (right side state in FIG. 4) in the state in which the sample S is stored in the syringe 21.

As shown in FIG. 3, in the sample suction operation, the amount of the sample S suctioned into the syringe 21 is substantially equal to the volume in the syringe 21 increased by moving the plunger 22 from the Z2 side to the Z1 side. Further, as shown in FIG. 4, in the sample discharge operation, the amount of the sample S discharged out of the syringe 21 is substantially equal to the volume in the syringe 21 decreased by moving the plunger 22 from the Z1 side to the Z2 side. Note that in FIG. 3 and FIG. 4, examples are shown in which the plunger 22 is moved from the Z2 side to the Z1 side by the distance L and the plunger 22 is moved from the Z1 side to the Z2 side by the distance L, respectively.

Figure 2:
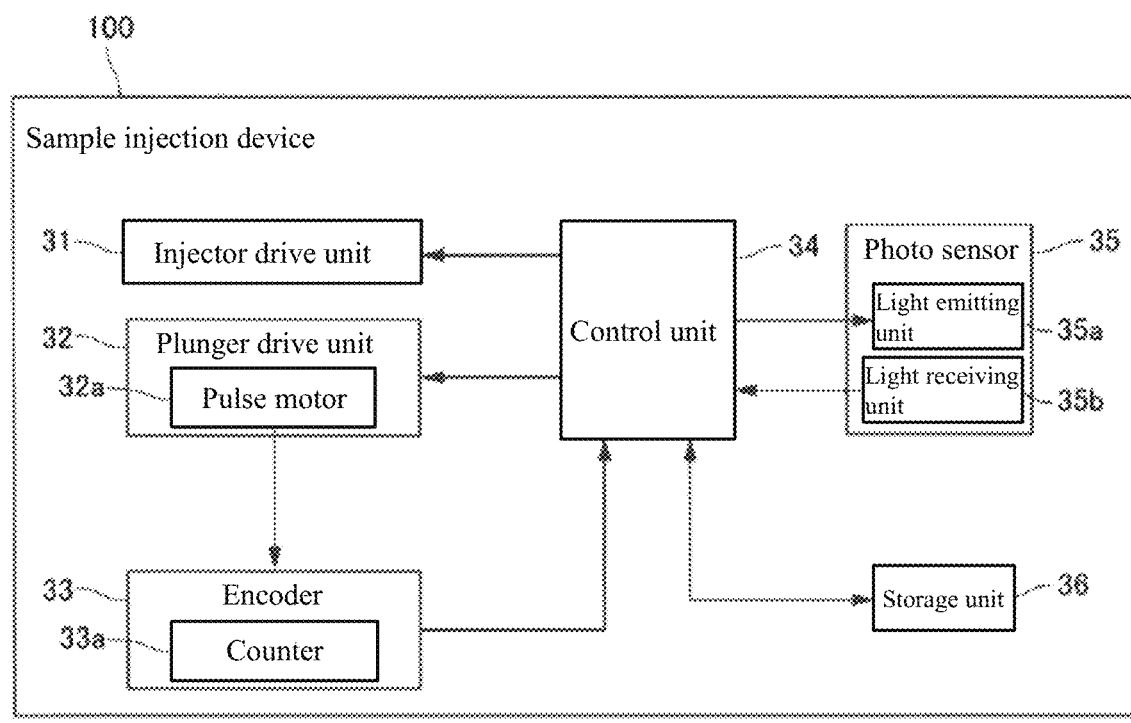
FIG. 2 is a block diagram related to the control of the sample injection device according to an embodiment of the present invention.

As shown in FIG. 2, the sample injection device 100 is provided with an injector drive unit 31, a plunger drive unit 32, an encoder 33, a control unit 34, a photo sensor 35, and a storage unit 36. Note that the photo sensor 35 is an example of the "optical sensor" recited in claims.

The injector drive unit 31 is configured to be able to move the injector 20 (see FIG. 1) in the horizontal direction and the vertical direction (Z-direction) in the sample injection device 100. Specifically, as shown in FIG. 1, the injector drive unit 31 (see FIG. 2) can move the injector 20 to a sample suction position, a penetration operation start position, a sample discharge position, and the like. Note that the "sample suction position" denotes a position at which the sample S in the vial 11 is suctioned into the syringe 21. Further note that the "penetration operation start position" denotes a position to start the penetration operation for penetrating the septum 911, which is a rubber lid member (of the sample introduction portion 910), in order to inject the sample S suctioned into the syringe 21 into the sample introduction portion 910 of the gas chromatography apparatus 900. Further note that the "sample discharge position" denotes a position at which the sample S in the syringe 21 is discharged in the sample introduction portion 910.

Figure 5A:
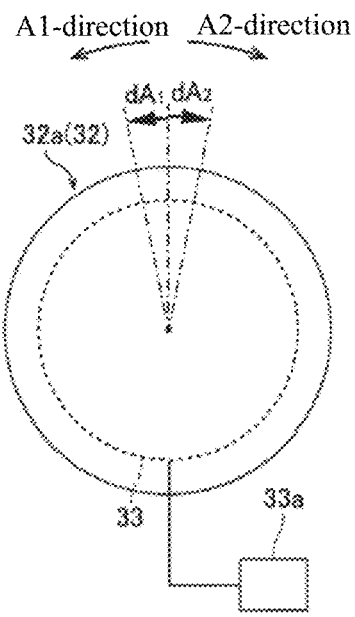
FIG. 5A is a diagram for explaining a rotational operation of a pulse motor of the sample injection device according to an embodiment of the present invention.
Figure 5B:
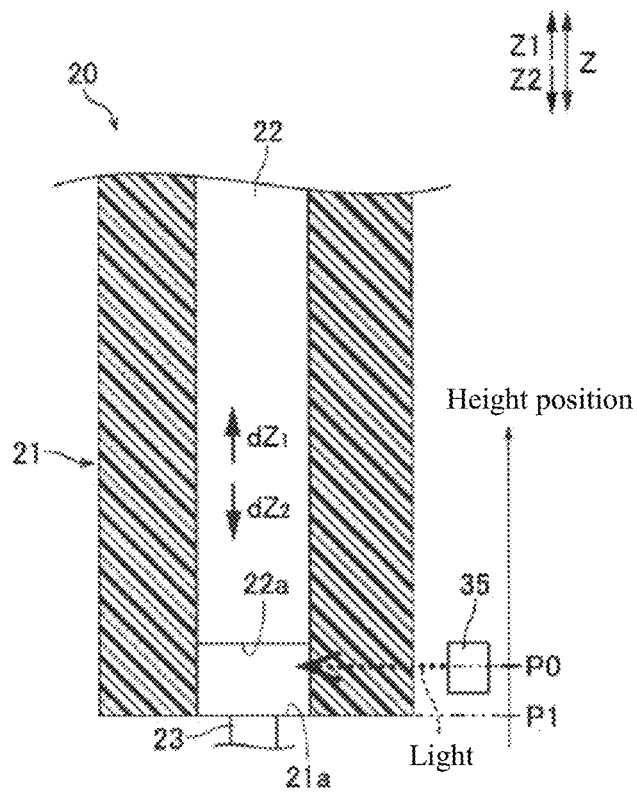
FIG. 5B is a diagram for explaining the movement of a plunger of the sample injection device plunger according to an embodiment of the present invention.

As shown in FIG. 2, the plunger drive unit 32 is configured to drive the plunger 22 by a pulse motor 32a that operates in synchronization with pulse power. As shown in FIG. 5A and FIG. 5B, the rotational movement of the pulse motor 32a is converted into a linear movement by a ball screw mechanism or the like, and is configured to move the plunger 22 in the Z-direction. In the sample injection device 100, the plunger 22 is moved in the Z1-direction and the Z2-direction, respectively, by the rotational movement of the pulse motor 32a to one side (A1-direction) and the other side (A2-direction). The rotation angle $dA_1$ in the A1-direction and the rotation angle $dA_2$ in the A2-direction of one pulse of pulse power correspond to the movement amount $dZ_1$ in the Z1-direction and the movement amount $dZ_2$ in the Z2-direction of the plunger 22, respectively. The movement amount $dZ_1$ and movement amount $dZ_2$ each are, for example, 0.01 mm.

The encoder 33 is a sensor for detecting the operating position of the pulse motor 32a. The encoder 33 is configured to detect the rotational speed and the rotational position of the pulse motor 32a. The encoder 33 is configured to detect a rotation operating position of the pulse motor 32a as a count value C. Specifically, as shown in FIG. 5A, the count value C (see FIG. 7) is configured to decrease by one count in accordance with the rotational motion of the pulse motor 32a by the rotation angle $dA_1$ in the A1-direction. Further, the count value C is configured to increase by one count in accordance with the rotational motion of the pulse motor 32a by the rotation angle $dA_2$ in the A2-direction. Note that the count value C is counted by the counter 33a.

As shown in FIG. 2, the control unit 34 is a computer configured so as to include a CPU (Central Processing Unit), a ROM (Read Only Memory), a RAM (Random Access Memory), and the like. The control unit 34 is configured to perform control to move the syringe 21 (see FIG. 1) and the plunger 22 (see FIG. 1) by the injector drive unit 31 and the plunger drive unit 32, respectively. That is, the plunger drive unit 32 is configured to control the drive of the pulse motor 32a.

In this embodiment, the control unit 34 is configured to adjust the reference position (zero point) of the tip end 22a of the plunger 22 with respect to the syringe 21 based on the operating position detected by the encoder 33 when the tip end 22a of the plunger 22 (see FIG. 1) is brought into contact with the tip end side (Z2 side) end portion 21a in the syringe 21 (see FIG. 1). The reference position (zero point) means the height position (see FIG. 6A to FIG. 6D) of the tip end 22a of the plunger 22 with respect to the syringe 21 when starting the sample suction operation and when ending the sample discharge operation. The adjustment operation of the reference position of the plunger 22 by the control unit 34 will be described later.

The photo sensor 35 is configured to detect the position of the tip end 22a of the plunger 22 (see FIG. 1) using light reflection. Specifically, the photo sensor 35 includes a light emitting portion 35a and a light receiving portion 35b. As shown in FIG. 5B, the photo sensor 35 is provided in the vicinity of the height position P0, and emits light in the horizontal direction from the light emitting portion 35a toward the syringe 21. The light reflected when an object (reflecting object) is present is detected by the light receiving portion 35b. With this, it is possible to detect whether or not the position of the tip end 22a of the plunger 22 is present at the height position P0.

As shown in FIG. 2, the storage unit 36 includes, for example, a non-volatile memory or a hard disk drive (HDD). The storage unit 36 stores programs and the like used for the processing of the control unit 34.

(Method of Adjusting Reference Position)

Next, with reference to FIG. 6A to FIG. 6D, FIG. 7, and FIG. 8, the adjustment operation (adjustment method) of the reference position (zero point) of the plunger 22 by the control unit 34 will be described.

Figure 7:
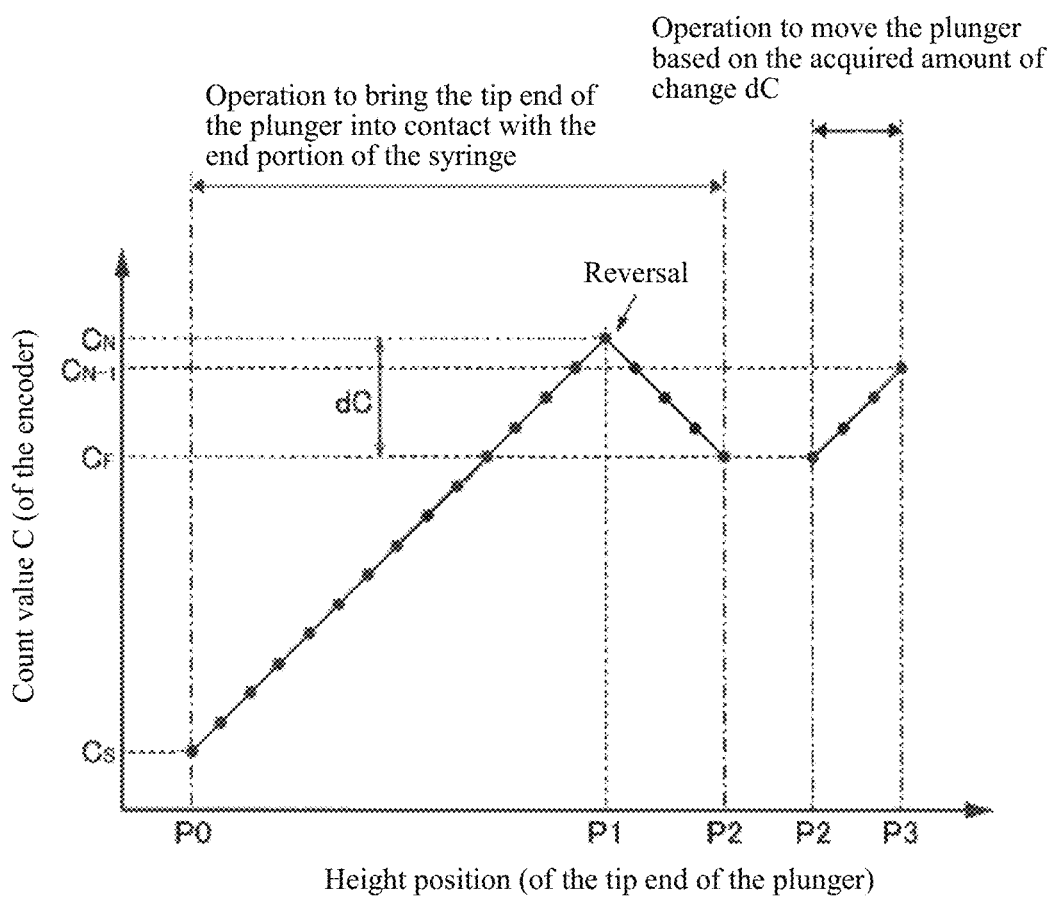
FIG. 7 is a diagram showing the relationship between the height position of the tip end of the plunger and the count value of the encoder in adjusting the reference position of the plunger of the sample injection device according to an embodiment of the present invention.

In this embodiment, as shown in FIG. 7, the control unit 34 is configured to adjust the reference position based on the count value C when the count value C is reversed from the increase state to the decrease state when the tip end 22a of the plunger 22 is brought into contact with the end portion 21a of the tip end side (Z1 side) in the syringe 21.

In detail, the control unit 34 is configured to adjust the reference position based on the amount of change dC of the count value C after reversal of the count value C when the tip end 22a of the plunger is brought into contact with the end portion 21a in the syringe 21 on the tip end side and the count value C is reversed. Further, the control unit 34 is configured to adjust the reference position by setting the count value C at a position where the tip end 22a of the plunger 22 is moved in the syringe 21 so that the tip end 22a of the plunger 22 approaches the count value C when the tip end 22a of the plunger 22 is brought into contact with the end portion 21a of the syringe 21 on the tip end side by an amount smaller than the amount of change dC of the count value after the reversal of the count value C as the reference position.

Figure 6A:
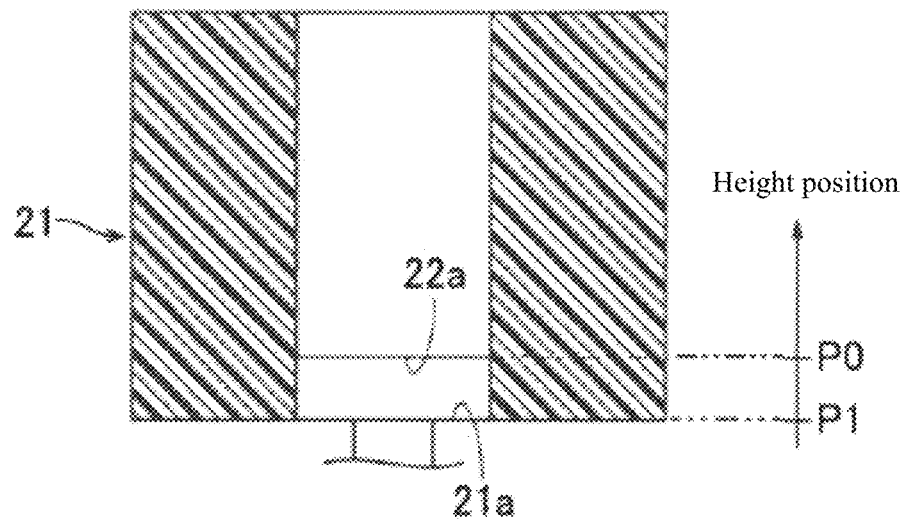
FIG. 6A is a diagram showing a state in which the plunger is moved to a predetermined position in adjusting the reference position of the plunger of the sample injection device according to an embodiment of the present invention.
Figure 8:
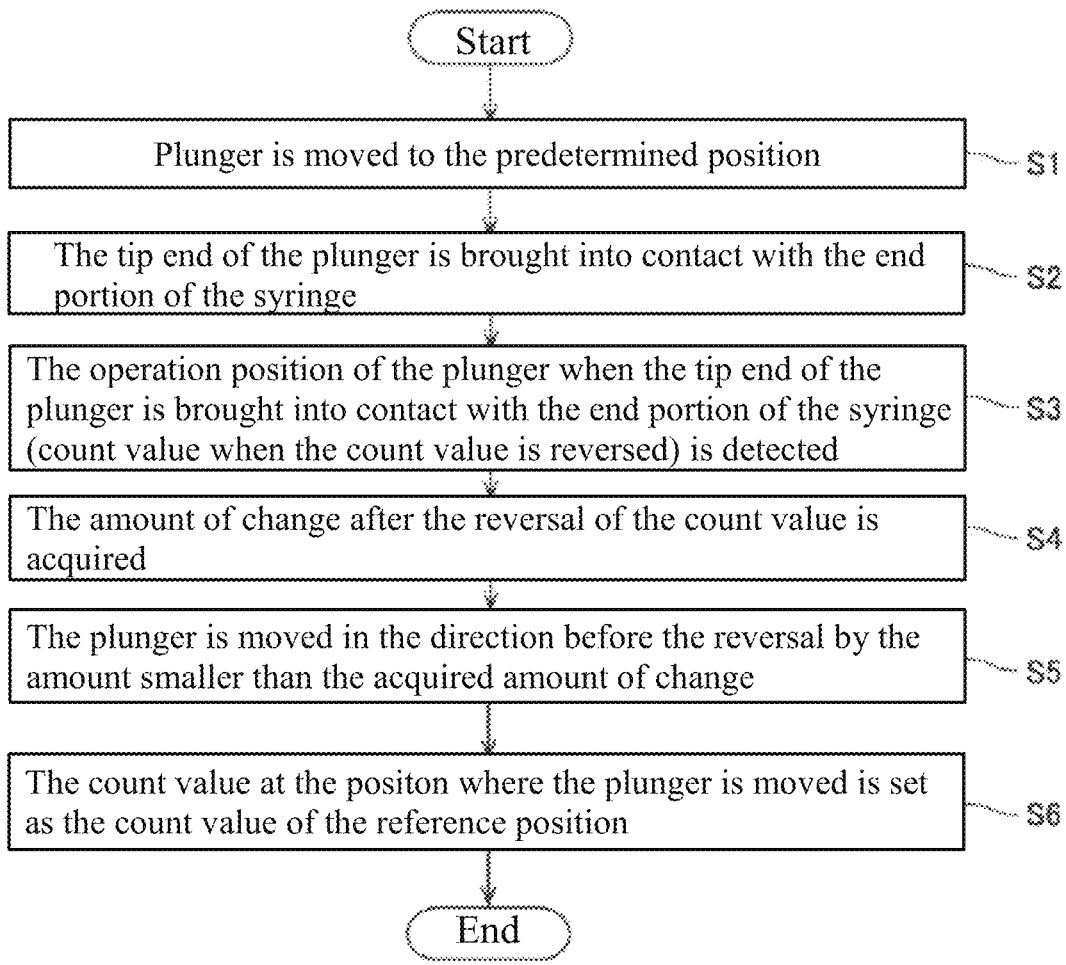
FIG. 8 is a flow diagram for explaining the adjustment of the reference position of the plunger of the sample injection device according to one embodiment of the present invention.

Specifically, as shown in FIG. 6A, the plunger 22 is moved by the plunger drive unit 32 to a predetermined position (height position P0) (Step S1 in FIG. 8). Note that whether or not the plunger 22 is positioned at the height position P0 is detected using the photo sensor 35. As shown in FIG. 7, when the tip end 22a of the plunger 22 is positioned at the height position P0, the count value C of the encoder 33 is the count value $C_S$. And, in this embodiment, the control unit 34 is configured to adjust the reference position based on the operating position of the pulse motor 32a as will be described later after bringing the position of the tip end 22a of the plunger 22 close to the reference position (after moving the tip end 22a of the plunger 22 to the height position P0) based on the position of the tip end 22a of the plunger 22 detected by the photo sensor 35.

Figure 6B:
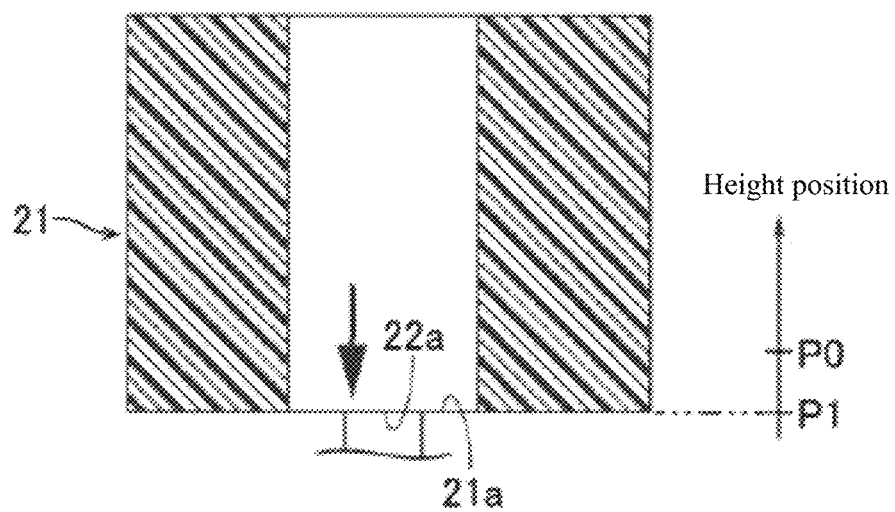
FIG. 6B is a diagram showing a state in which the tip end of the plunger is brought into contact with the end portion in the syringe on the tip end side in adjusting the reference position of the plunger of the sample injection device according to one embodiment of the present invention.

Next, as shown in FIG. 6B, the plunger 22 is moved (lowered) in the Z2-direction by the pulse motor 32a of the plunger drive unit 32, and the tip end 22a of the plunger 22 is brought into contact with the end portion 21a in the syringe 21 on the tip end side (Step S2 in FIG. 8). In this embodiment, the control unit 34 is configured to bring the tip end 22a of the plunger 22 into contact with the end portion 21a in the syringe 21 on the tip end side in a state in which the drive current of the pulse motor 32a of the plunger drive unit 32 is lower than a normal state. Note that the "normal state" of the drive current of the pulse motor 32a denotes a state in which the plunger 22 is reciprocated in the syringe 21 in order to suction the sample S into the syringe 21 or discharge the sample S out of the syringe 21.

Next, the operating position when the tip end 22a of the plunger 22 is brought into contact with the end portion 21a in the syringe 21 on the tip end side is detected by the encoder 33 (Step S3 of FIG. 8). As will be described later, the operating position when the tip end 22a of the plunger 22 is brought into contact with the end portion 21a in the syringe 21 on the tip end side is detected as a count value $C_N$ immediately before the inversion of the count value C. As shown in FIG. 7, when the tip end 22a of the plunger 22 is positioned at the height position P1 (the tip end 22a of the plunger 22 is in contact with the end portion 21a in the syringe 21 on the tip end side), the count value C of the encoder 33 is the count value $C_N$ (which is larger than the count value $C_S$).

Figure 6C:
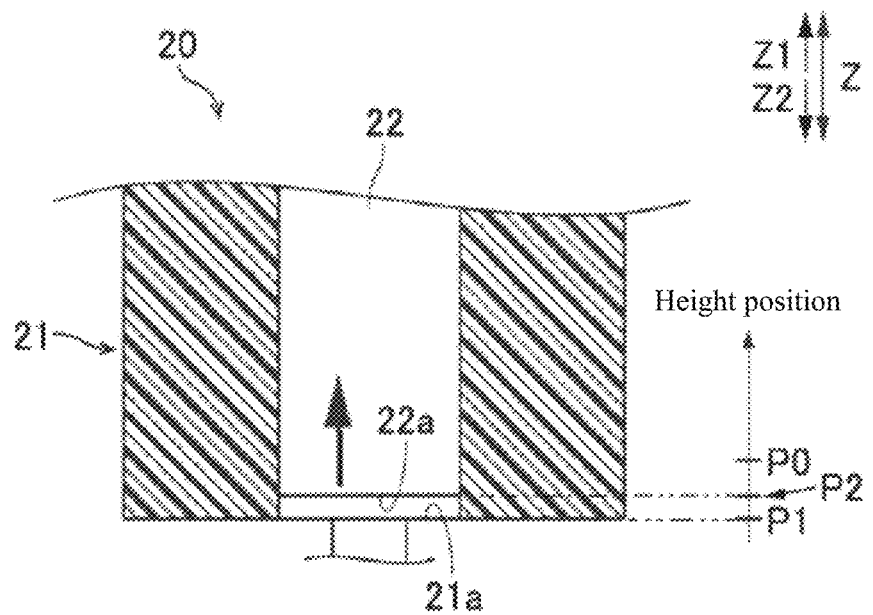
FIG. 6C is a diagram showing the state in which the tip end of the plunger is brought into contact with the end portion in the syringe on the tip end side and then moved to the other side so that the tip end of the plunger is moved away from the end portion in the syringe on the tip end side in adjusting the reference position of the plunger of the sample injection device according to an embodiment of the present invention.

Here, when the plunger 22 is brought into contact with the end portion 21a in the syringe 21 on the needle 23 side, the pulse motor 32a loses the synchronous (becomes out of synchronization). In this case, as shown in FIG. 6C, the plunger 22 is moved to the opposite side (Z1 side) so as to be away from the end portion 21a in the syringe 21 on the needle 23 side due to reversing of the rotational direction of the pulse motor 32a. With this, as shown in FIG. 7, the count value C detected by the encoder 33 is reversed from the increase state to the decrease state. Specifically, the count value C of the encoder 33 increases from the count value $C_S$ (height position P0) at the start of descending of the plunger 22 as the plunger 22 descends. Then, the count value C of the encoder 33 is reversed from the increase state to the decrease state at the count value $C_N$ (height position P1) as the rotational direction of the pulse motor 32a is reversed. The count value $C_N$ at the height position P1 is stored in the storage unit 36 (see FIG. 2).

As shown in FIG. 6C, when the direction of rotation of the pulse motor 32a is reversed, the movement direction of the plunger 22 is changed from the Z2-direction to the Z1-direction, and thereafter the plunger 22 stops at the position (height position P2) which has advanced in the Z1-direction for a while from the height position P1. As shown in FIG. 7, when the tip end 22a of the plunger 22 is positioned at the height position P2, the count value C of the encoder 33 becomes the count value $C_F$ (smaller than count value $C_N$). Note that the count value $C_F$ at the height position P2 is stored in the storage unit 36 (see FIG. 2).

Next, as shown in FIG. 7, the control unit 34 acquires the amount of changed dC after inversion of the count value C in the case where the count value C is reversed from the increase state to the decrease state when the tip end 22a of the plunger 22 is brought into contact with the end portion 21a in the syringe 21 on the tip end side (Step S4 in FIG. 8). Specifically, the amount of change dC (4 counts) of the count value C from the count value $C_N$ (height position P1) to the count value $C_F$ (height position P2) is acquired.

Figure 6D:
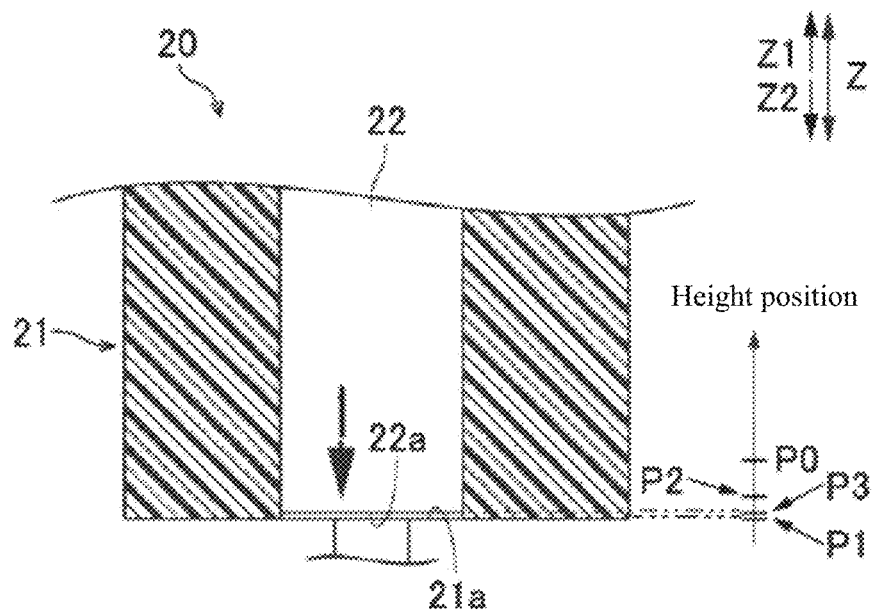
FIG. 6D is a diagram showing the state in which the plunger is moved so that the tip end of the plunger approaches the position closer to the state in which the tip end of the plunger is in contact with the end portion in the syringe on the tip end side than the state in which the tip end of the plunger is moved so as to be apart from the end portion in the syringe on the tip end side to the other side in adjusting the reference position of the plunger of the sample injection device according to an embodiment of the present invention.

Next, as shown in FIG. 6D, the control unit 34 (see FIG. 2) drives the plunger drive unit 32 so that the tip end 22a of the plunger 22 gets closer to the count value $C_N$ when the end portion 21a of the tip end side (Z2 side) of the syringe 21 is brought into contact with the end portion 21a of the tip end side (Z2 side) of the syringe by the amount (3 counts) smaller than the acquired amount of change dC of the count value (4 counts) (Step S5 in FIG. 8). With this, the tip end 22a of the plunger 22 is moved to the height position P3 closer to the height position P1 (when it is brought into contact with the end portion 21a in the syringe 21 on the tip end side) than the height position P2 (when the pulse motor 32a stops after being reversed in the rotational direction). In this case, as shown in FIG. 7, the count value C of the encoder 33 changes from the count value $C_N$ to the count value $C_{N-1}$ (larger than the count value $C_F$ and smaller than the count value $C_N$).

Then, the control unit 34 performs the control to turn off the excitation of the pulse motor 32a. In this state, the control unit 34 acquires the count value $C_{N-1}$ (height position P3) and sets this count value $C_{N-1}$ as a count value C of the reference position (zero point) (Step S6 in FIG. 8). With this, the control unit 34 ends the adjustment operation of the reference position (zero point).

It is conceivable to automatically adjust the reference position of the plunger 22 after replacing the syringe 21 by using the photo sensor 35. However, considering the instrumental error (error due to mounting) of the photo sensor 35, it is necessary to provide the photo sensor 35 at a height position away from the end portion 21a in the syringe 21 on the needle 23 side to the Z2 side. Therefore, it is difficult to provide the photo sensor 35 as close as possible to the end portion 21a in the syringe 21 on the needle 23 side. For this reason, if the reference position of the plunger 22 is automatically adjusted using the photo sensor 35, it is difficult to accurately adjust the reference position as in this embodiment in which the reference position is adjusted based on the count value C of the encoder 33.

(Effects of the Device of Embodiment)

In the device of this embodiment, the following effects can be obtained.

In this embodiment, as described above, the sample injection device 100 is provided with the control unit 34 for adjusting the reference position of the tip end 22a of the plunger 22 with respect to the syringe 21 (the reference position which is served as the position of the tip end of the plunger 22 with respect to the syringe 21 at the time of starting the suction of the sample S and ending the discharge of the sample S) based on the operating position of the pulse motor 32a detected by the encoder 33 when the tip end 22a of the plunger 22 is brought into contact with the end portion 21a in the syringe 21 on the tip end side.

With this, even if the plunger 22 leaves the end portion 21a in the syringe 21 on the side of the needle 23 with the loss of synchronous of the pulse motor 32a due to the fact that the tip end 22a of the plunger 22 is brought into contact with the end portion 21a in the syringe 21 on the tip end side, the control unit 34 adjusts the reference position based on the operating position of the pulse motor 32a detected by the encoder 33 when the tip end 22a of the plunger 22 is actually brought into contact with the end portion 21a in the syringe 21 on the tip end side. Therefore, it is possible to automatically adjust the reference position of the plunger 22 driven by the pulse motor 32a (the reference position which is served as the position of the tip end of the plunger 22 with respect to the syringe 21 at the time of starting the suction of the sample S and ending the discharge of the sample S).

Further, in this embodiment, as described above, the encoder 33 is configured to detect the rotation operating position of the pulse motor 32a as a count value C. And the control unit 34 is configured to adjust the reference position based on the count value C detected by the encoder 33 when the tip end 22a of the plunger 22 is brought into contact with the end portion 21a in the syringe 21 on the tip end side. With this, the operating position (rotation operating position) of the pulse motor 32a is detected as a count value C which is easily processed by the control unit 34, the process by the control unit 34 for adjusting the reference position can be performed quickly.

In this embodiment, as described above, the control unit 34 is configured to adjust the reference position based on the count value C when the count value C is reversed from the increase state to the decrease state when the tip end 22a of the plunger 22 is brought into contact with the end portion 21a in the syringe 21. With this, the count value C when the increase state and the decrease state are reversed indicates a count value C when the pulse motor 32a lost the synchronous and the rotational direction of the pulse motor 32a is reversed (i.e., the operating position where the tip end 22a of the plunger 22 is brought into contact with the end portion 21a in the syringe 21 on the tip end side), and therefore the reference position can be easily adjusted based on the count value C.

Further, in this embodiment, as described above, the control unit 34 is configured to adjust the reference position based on the amount of change dC of the count value C after reversal of the count value C when the tip end 22a of the plunger 22 is brought into contact with the end portion 21a in the syringe 21 on the tip end side and the count value C is reversed. With this, the reference position can be adjusted appropriately based on the amount of change dC.

Further, in this embodiment, as described above, the control unit 34 is configured to drive the plunger drive unit 32 so that the tip end 22a of the plunger 22 gets closer to the count value C when the end portion 21a of the tip end 22a of the plunger 22 is brought into contact with the end portion 21a in the syringe 21 on the tip end side by the amount smaller than the amount of change dC of the count value after the reverse of the count value C. Further, the control unit 34 is configured to adjust the reference position by setting the count value C at the position where the tip end 22a of the plunger 22 is moved in the syringe 21 by driving the plunger drive unit 32 as a reference position.

With this, the count value C is changed in the direction before the reversal by the amount smaller than the amount of change dC of the count value after the reversal. Therefore, the tip end 22a of the plunger 22 will not be brought into contact with the end portion 21a of the syringe 21 on the tip end side, and the reference position can be easily adjusted so that the tip end 22a of the plunger 22 approaches the end portion 21a of the syringe 21 on the tip end side.

Further, in this embodiment, as described above, the control unit 34 is configured to bring the tip end 22a of the plunger 22 into contact with the end portion 21a in the syringe 21 on the tip end side in a state in which the drive current of the pulse motor 32a of the plunger drive unit 32 is lower than a normal state. Note that the "normal state" of the drive current of the pulse motor 32a denotes a state in which the plunger 22 is reciprocated in the syringe 21 in order to suction the sample S into the syringe 21 or discharge the sample S out of the syringe 21.

With this, the torque of the pulse motor 32a can be reduced to reduce the force (force that the plunger 22 presses the syringe 21) when bringing the tip end 22a of the plunger 22 into contact with the end portion 21a in the syringe 21 on the tip end side, so that it is possible to suppress the increase in mechanical load on the plunger 22 and the syringe 21. Further, when bringing the tip end 22a of the plunger 22 into contact with the end portion 21a in the syringe 21 on the tip end side, unlike the case in which the force (force that the plunger 22 pushes the syringe 21) acts from the plunger 22 to the syringe 21 is large, the amount of elastic deformation occurring in the plunger 22 and the syringe 21 can be reduced. As a result, it is possible to suppress the possibility of occurrence of errors in adjusting the reference position.

Further, in this embodiment, as described above, the control unit 34 is configured to adjust the reference position based on the operating position after bringing the position of the tip end 22a of the plunger 22 close to the reference position based on the position of the tip end 22a of the plunger 22 detected by the photo sensor 35. With this, the reference position is adjusted relatively precisely based on the operating position after bringing it relatively roughly close to the reference position using the photo sensor 35.

Therefore, the adjustment time of the reference position can be shortened as compared with the case in which the operation for roughly approaching the reference position is not performed.

(Effects of the Adjustment Method of Embodiment)

According to the adjustment method of the present embodiment, the following effects can be obtained.

In this embodiment, as described above, the tip end 22a of the plunger 22 is brought into contact with the end portion 21a in the syringe 21 on the tip end side, and the operating position of the pulse motor 32a when the tip end 22a of the plunger 22 is brought into contact with the end portion 21a in the syringe on the tip end side is detected. Based on the detected operating position, the reference position of the tip end 22a of the plunger 22 with respect to the syringe 21 (the reference position which is served as the position of the tip end 22a of the plunger 22 with respect to the syringe 21 at the time of starting the suction of the sample S and ending the discharge of the sample S) is adjusted.

With this, even if the plunger 22 leaves the end portion 21a in the syringe 21 on the needle 23 side with the loss of synchronous of the pulse motor 32a due to the fact that the tip end 22a of the plunger 22 is brought into contact with the end portion in the syringe 21 on the tip end side, the control unit 34 adjusts the reference position based on the operating position of the pulse motor 32a detected by the encoder 33 when the tip end 22a of the plunger 22 is actually brought into contact with the end portion 21a in the syringe 21 on the tip end side. Therefore, it is possible to automatically adjust the reference position of the plunger 22 driven by the pulse motor 32a (the reference position which is served as the position of the tip end 22a of the plunger 22 with respect to the syringe 21 at the time of starting the suction of the sample S and ending the discharge of the sample S).

Further, in this embodiment, as described above, the steps of adjusting the reference position include: a step of acquiring the amount of change dC after the reversal of the count value C when the count value C is reversed from the increase state to the decrease state, or from the decrease state to the increase state, when the tip end 22a of the plunger 22 is brought into contact with the end portion 21a in the syringe 21 on the tip end side; and a step of adjusting the reference position by setting the count value C at a position where the plunger 22 is moved in the syringe 21 by driving the plunger drive unit 32 so that the tip end 22a of the plunger 22 approaches the count value C when the tip end 22a of the plunger 22 is brought into contact with the end portion 21a in the syringe 21 on the tip end side by an amount smaller than the acquired amount of change dC of the count value after the reversal of the count value C as the reference position.

Thus, by acquiring the amount of change dC after the reversal of the count value C when the count value C is reversed, it is possible to grasp the position of the plunger 22 moved due to the loss of synchronous after the tip end 22a of the plunger 22 is brought into contact with the end portion 21a in the syringe 21 on the tip end side. Then, the count value C at a position where the plunger 22 is moved in the syringe 21 so that the tip end 22a of the plunger 22 approaches the count value C when the end portion 21a of the syringe 21 is brought into contact with the end portion 21a in the syringe 21 on the tip end side by the amount smaller than the acquired amount of change dC of the count value is set as a reference position. With this, the reference position can be adjusted so that the tip end 22a of the plunger 22 will not be brought into contact with the end portion 21a in the syringe 21 on the tip end side and the tip end 22a of the plunger 22 approaches the end portion 21a of the syringe 21 on the tip end side.

MODIFIED EXAMPLE

It should be understood that the embodiments disclosed here are examples in all respects and are not restrictive. The scope of the present invention is shown by the scope of the claims rather than the descriptions of the embodiments described above, and includes all changes (modifications) within the meaning of equivalent and the scope of claims.

For example, in the above embodiment, it is configured such that the count value C is increased or decreased by one count by the rotational motion of one pulse of the pulse motor 32a, but the present invention is not limited to this. In the present invention, it may be configured such that the count value C is increased or decreased by one count in accordance with the rotational motion of two or more pulses of the pulse motor 32a.

Further, in the above embodiment, an example is shown in which the reference position is adjusted based on the count value C when the count value C is reversed from the increase state to the decrease state, but the present invention is not limited to this. In the present invention, the reference position may be adjusted based on the count value when the count value is reversed from the decrease state to the increase state. Note that in that case, when the tip end of the plunger is moved in the direction approaching the end portion in the syringe on the needle side, it is configured such that the count value detected by the encoder decreases.

Further, in the above embodiment, an example is shown in which the amount of change after the reversal of the count value C is four when the count value C is reversed, but the present invention is not limited to this. The amount of change after the reversal of the count value C differs depending on the type of the pulse motor, the shape (size) of the plunger and syringe, and the like.

In the above embodiment, an example is shown in which the reference position is adjusted based on the operating position after the adjustment of the reference position based on the position of the tip end 22a of the plunger 22 detected by the photo sensor 35, but the present invention is not limited to this. In the present invention, the reference position may be adjusted based only on the operating position without adjusting the reference position by the photo sensor.

The invention claimed is:

1. A sample injection device comprising:
   a cylindrical syringe configured to store a sample therein;
   a needle attached to a tip end side of the syringe and having a flow passage formed therein;
   a plunger configured to suction the sample into the syringe or discharge the sample out of the syringe through the flow passage of the needle by linearly reciprocating inside the syringe;
   a plunger drive unit configured to drive the plunger by a pulse motor that operates in synchronization with pulse power;
   an encoder configured to detect an operating position of the pulse motor; and
   a control unit configured to control driving of the pulse motor of the plunger drive unit,
   wherein the control unit is configured to adjust a reference position of a tip end of the plunger with respect to the syringe based on the operating position detected by the encoder when the tip end of the plunger is brought into contact with an end portion in the syringe on the tip end side.

2. The sample injection device as recited in claim 1,
wherein the encoder is configured to detect a rotation operating position of the pulse motor as a count value, and
wherein the control unit is configured to adjust the reference position based on the count value detected by the encoder when the tip end of the plunger is brought into contact with the end portion in the syringe on the tip end side.

3. The sample injection device as recited in claim 2,
wherein the count value increases in accordance with an operation to one side of the pulse motor and decreases in accordance with an operation to the other side of the pulse motor, and
wherein the control unit is configured to adjust the reference position based on the count value when the count value is reversed from an increase state to a decrease state, or from a decrease state to an increase state, when the tip end of the plunger is brought into contact with the end portion in the syringe on the tip end side.

4. The sample injection device as recited in claim 3,
wherein the control unit is configured to adjust the reference position based on an amount of change of the count value after reversal of the count value when the tip end of the plunger is brought into contact with the end portion in the syringe on the tip end side and the count value is reversed.

5. The sample injection device as recited in claim 4,
wherein the control unit is configured to adjust the reference position by setting the count value at a position where the tip end of the plunger is moved in the syringe by driving the plunger drive unit so that the tip end of the plunger approaches the count value when the tip end of the plunger is brought into contact with the end portion in the syringe on the tip end side by an amount smaller than the amount of change of the count value after the reversal of the count value as the reference position.

6. The sample injection device as recited in claim 1,
wherein the control unit is configured to bring the tip end of the plunger into contact with the end portion in the syringe on the tip end side in a state in which a drive current of the pulse motor of the plunger drive unit is lower than a normal state in which the plunger is reciprocated in the syringe to suction the sample into the syringe or discharge the sample out of the syringe.

7. The sample injection device as recited in claim 1, further comprising:
an optical sensor configured to detect a position of the tip end of the plunger using reflection of light,
wherein the control unit is configured to adjust the reference position based on the operating position after bringing the position of the tip end of the plunger close to the reference position based on the position of the tip end of the plunger detected by the optical sensor.

8. A method of adjusting a sample injection device, the sample injection device comprising: a cylindrical syringe configured to store a sample therein; a needle attached to a tip end side of the syringe and having a flow passage formed therein; a plunger configured to suction the sample into the syringe or discharge the sample out of the syringe through the flow passage of the needle by linearly reciprocating inside the syringe; a plunger drive unit configured to drive the plunger by a pulse motor that operates in synchronization with pulse power; and an encoder configured to detect an operating position of the pulse motor, the method comprising:
a step of bringing a tip end of the plunger into contact with an end portion in the syringe on the tip end side by the pulse motor of the plunger drive unit;
a step of detecting the operating position in response to the tip end of the plunger being brought into contact with the end portion in the syringe on the tip end side by the encoder; and
a step of adjusting a reference position of the tip end of the plunger with respect to the syringe based on the detected operating position.

9. The method of adjusting the sample injection device as recited in claim 8,
wherein the encoder is configured to detect a rotation operating position of the pulse motor as a count value,
wherein the count value increases in accordance with an operation to one side of the pulse motor and decreases in accordance with an operation to the other side of the pulse motor, and
wherein the step of adjusting the reference position comprises:
a step of acquiring an amount of change after reversal of the count value when the count value is reversed from an increase state to a decrease state or from a decrease state to an increase state when the tip end of the plunger is brought into contact with the end portion in the syringe on the tip end side; and
a step of adjusting the reference position by setting the count value at a position where the tip end of the plunger is moved in the syringe by driving the plunger drive unit so that the tip end of the plunger approaches the count value when the tip end of the plunger is brought into contact with the end portion in the syringe on the tip end side by an acquired amount smaller than the amount of change of the count value after the reversal of the count value as the reference position.

* * * * *